United States Patent [19]
Hunter, Jr. et al.

[11] Patent Number: 5,473,885
[45] Date of Patent: Dec. 12, 1995

[54] PULSE DETONATION ENGINE

[75] Inventors: Louis G. Hunter, Jr., Fort Worth; Don D. Winfree, Keller, both of Tex.

[73] Assignee: Lockheed Corporation, Fort Worth, Tex.

[21] Appl. No.: 265,661

[22] Filed: Jun. 24, 1994

[51] Int. Cl.$^6$ ............................................. F02K 7/06
[52] U.S. Cl. ..................... 60/204; 60/247; 60/39.78; 431/1
[58] Field of Search .................... 60/39.06, 39.36, 60/39.38, 39.39, 39.40, 39.76, 39.78, 39.8, 39.81, 204, 247, 248; 431/1, 174, 176, 178, 179, 180, 280

[56] References Cited

U.S. PATENT DOCUMENTS

| | | | |
|---|---|---|---|
| 2,518,002 | 8/1950 | Goddard | 60/201 |
| 2,930,196 | 3/1960 | Hertzberg | 60/39.76 |
| 3,473,879 | 10/1969 | Berberich | 60/39.76 |
| 3,634,778 | 1/1972 | Melikian et al. | |
| 3,812,783 | 5/1974 | Yang et al. | |
| 4,741,154 | 5/1988 | Eidelman | |
| 4,870,903 | 10/1989 | Carel et al. | |
| 5,280,705 | 1/1994 | Epstein et al. | 60/247 |
| 5,345,758 | 9/1994 | Bussing | 60/39.76 |

OTHER PUBLICATIONS

T. Bussing and G. Pappas, "An Introduction to Pulse Detonation Engines," 32nd Aerospace Sciences Meeting & Exhibit, Jan. 10–13, 1994 (14 pages).

*Primary Examiner*—Louis J. Casaregola
*Attorney, Agent, or Firm*—James E. Bradley

[57] ABSTRACT

A pulse detonation engine has a detonation chamber with a sidewall. At least two fuel ports are located in the sidewall, spaced longitudinally apart from each other. An oxygen fuel mixture is introduced into the forward port and detonated. This creates a detonation wave which propagates with an air fuel mixture introduced into the rearward fuel port. After the detonation, purge air passes through the chamber before the next detonation. A rotating sleeve valve mounted around the detonation opens and closes the fuel ports as well the purge ports.

29 Claims, 5 Drawing Sheets

PULSE DETONATION ENGINE

CROSS REFERENCE TO RELATED APPLICATION

This application is being filed simultaneously with another application by the same inventors entitled ANNULAR PULSE DETONATION APPARATUS.

BACKGROUND OF THE INVENTION

1. Field of the Invention

This invention relates in general to jet engines, and in particular to pulse detonation engines.

2. Summary of the Prior Art

A pulse detonation engine is an apparatus which produces a high pressure exhaust from a series of repetitive detonations within a detonation chamber. The process is a constant volume heat addition process. A gaseous fuel is detonated within a chamber, causing a pulse detonation wave which propagates at supersonic speeds. The detonation wave compresses the fluid within the chamber, increasing its pressure, density and temperature. As the detonation wave passes out the open rearward end, thrust is created. The cycle is then repeated.

At high speeds, such as Mach 2 to about Mach 3.5, such an engine would be theoretically more efficient than conventional turbojets because the engine does not require compressors or turbines. A pulse detonation engine supplying the same amount or more of thrust as a conventional gas turbine engine would theoretically weigh less.

Although theoretically desirable, to applicant's knowledge there are no pulse detonation engines being used as propulsion devices at this time. The reason may be the problems resulting from very high detonation chamber temperatures, approximately 3,500° F. Also, initiating repetitive detonations is a problem.

Another prior art engine, known as a pulse jet engine, was employed in World War II. That engine relied on slow moving deflagration, not detonation. The deflagration waves are subsonic, not supersonic waves. A pulse jet engine is not a pulse detonation engine.

SUMMARY OF THE INVENTION

In this invention, the pulse detonation engine has a first and second detonation chamber ports located in a sidewall of the chamber. These ports are spaced longitudinally apart from each other, with one being closer to the forward end than the other. An oxygen fuel valve introduces into the first chamber port an oxygen fuel mixture. The mixture has a much higher concentration of oxygen than exists in ambient or surrounding the engine. The fuel may be hydrogen, propane or other types. An igniter near the forward end detonates the oxygen fuel mixture, which creates a detonation wave that begins rapidly moving toward the open end of the chamber.

An air fuel mixture is introduced into the second port at the same time that the oxygen fuel mixture is introduced. The detonation wave created by the oxygen fuel detonation propagates into the air fuel mixture. The combined detonations cause the detonation wave to discharge from the discharge end at high pressure, creating thrust. After the detonation wave passes out the discharge end, a momentary purge of the chamber to ambient air occurs. This allows purging of exhaust products prior to introducing the oxygen fuel mixture for the next cycle.

In the preferred embodiment, the valving is handled by a fuel valve sleeve which mounts concentrically and sealing around the detonation chamber. The valve sleeve has first and second sleeve ports which will register with the first and second chamber ports at least once each revolution. The valve sleeve is rotated so that the oxygen fuel and air fuel mixture pass into the detonation chamber when the valve sleeve ports register or align with the detonation chamber ports.

In the preferred embodiment, a purge inlet extends through the forward wall and registers with a purge plate. The purge plate rotates with the valve sleeve and has at least one purge orifice. The purge plate is timed so that it will introduce ambient air for purging at the appropriate time between detonation cycles.

DETAILED DESCRIPTION OF THE INVENTION

Figure 1:
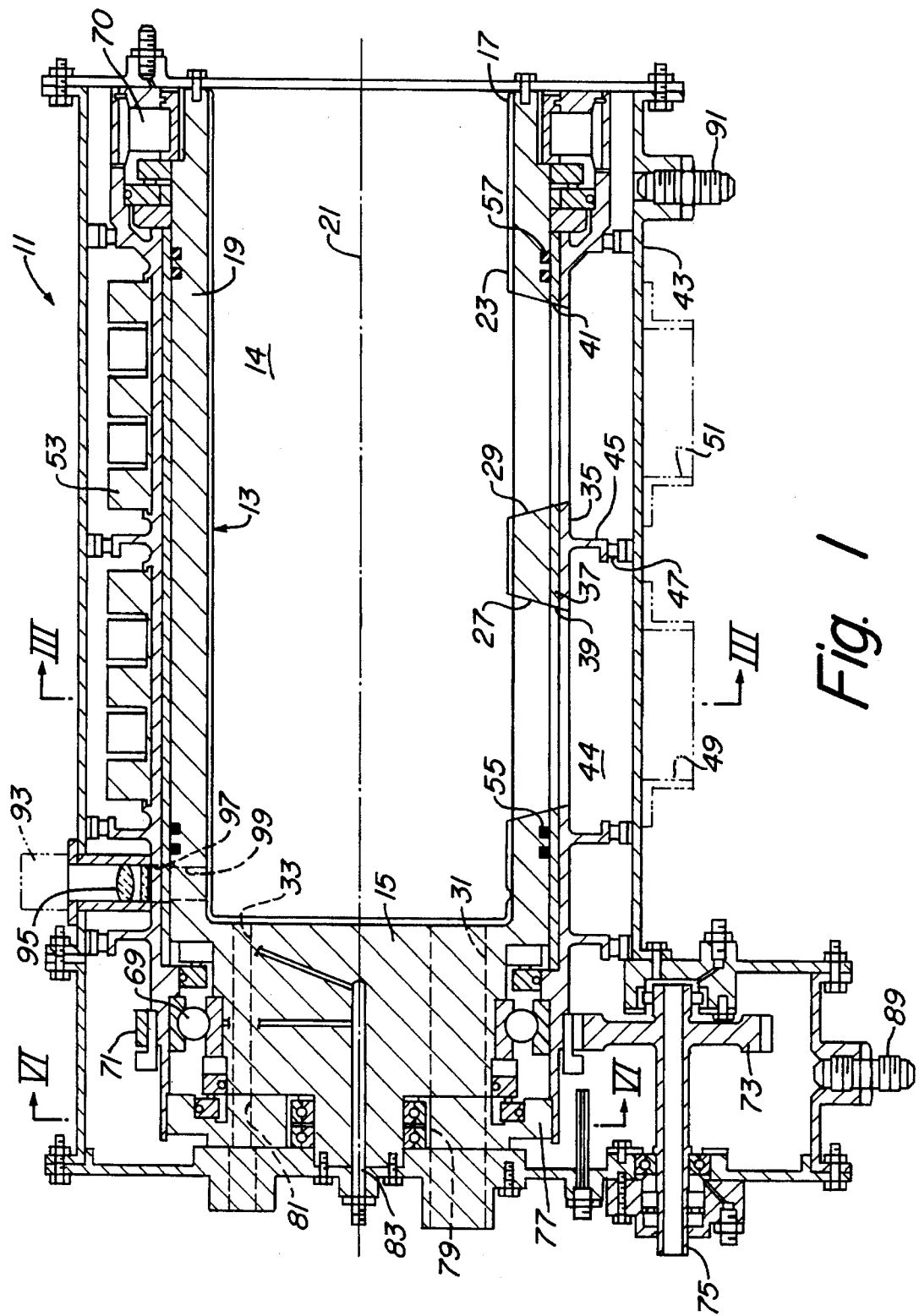
FIG. 1 is a sectional view taken along the lines I—I of FIG. 3 and illustrating a pulse detonation engine constructed in accordance with this invention.

Referring to FIG. 1, pulse detonation engine 11 has a detonation chamber 13. Chamber 13 is a housing having a cylindrical detonation cavity 14. Detonation chamber 13 has a forward wall 15 and an open rearward or discharge end 17. Detonation chamber 13 has a sidewall 19, the inner diameter of which defines cavity 14. The sidewall 19 is cylindrical about a longitudinal axis 21.

Figure 2:
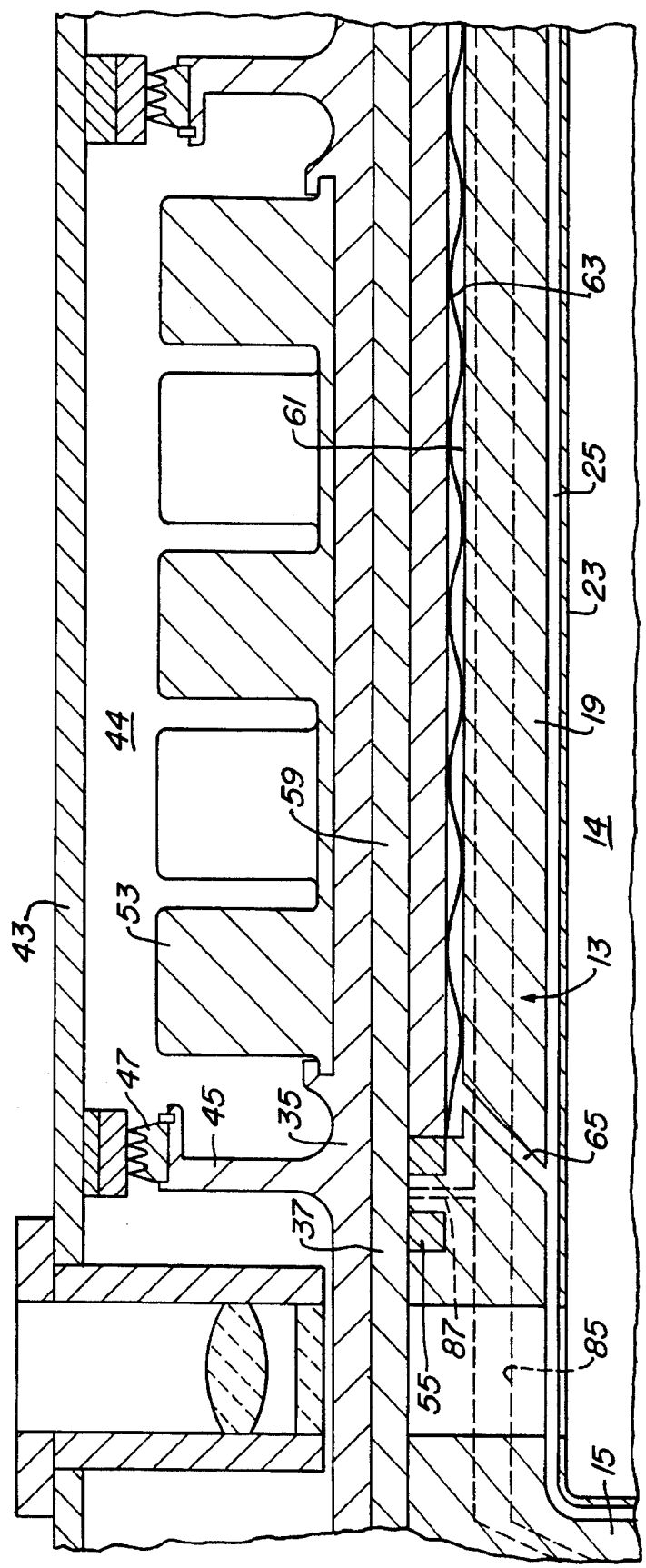
FIG. 2 is partial enlarged sectional view of the pulse jet detonation engine of FIG. 1, taken along the line II—II of FIG. 3.

Sidewall 19 has an internal liner 23 of high temperature material. Liner 23, as shown in FIG. 2, is spaced a short distance radially inward from the inner surface of sidewall 19, and slightly rearward from forward wall 15, defining clearances 25. Clearances 25 are used for circulating a cooling fluid.

Figure 3:
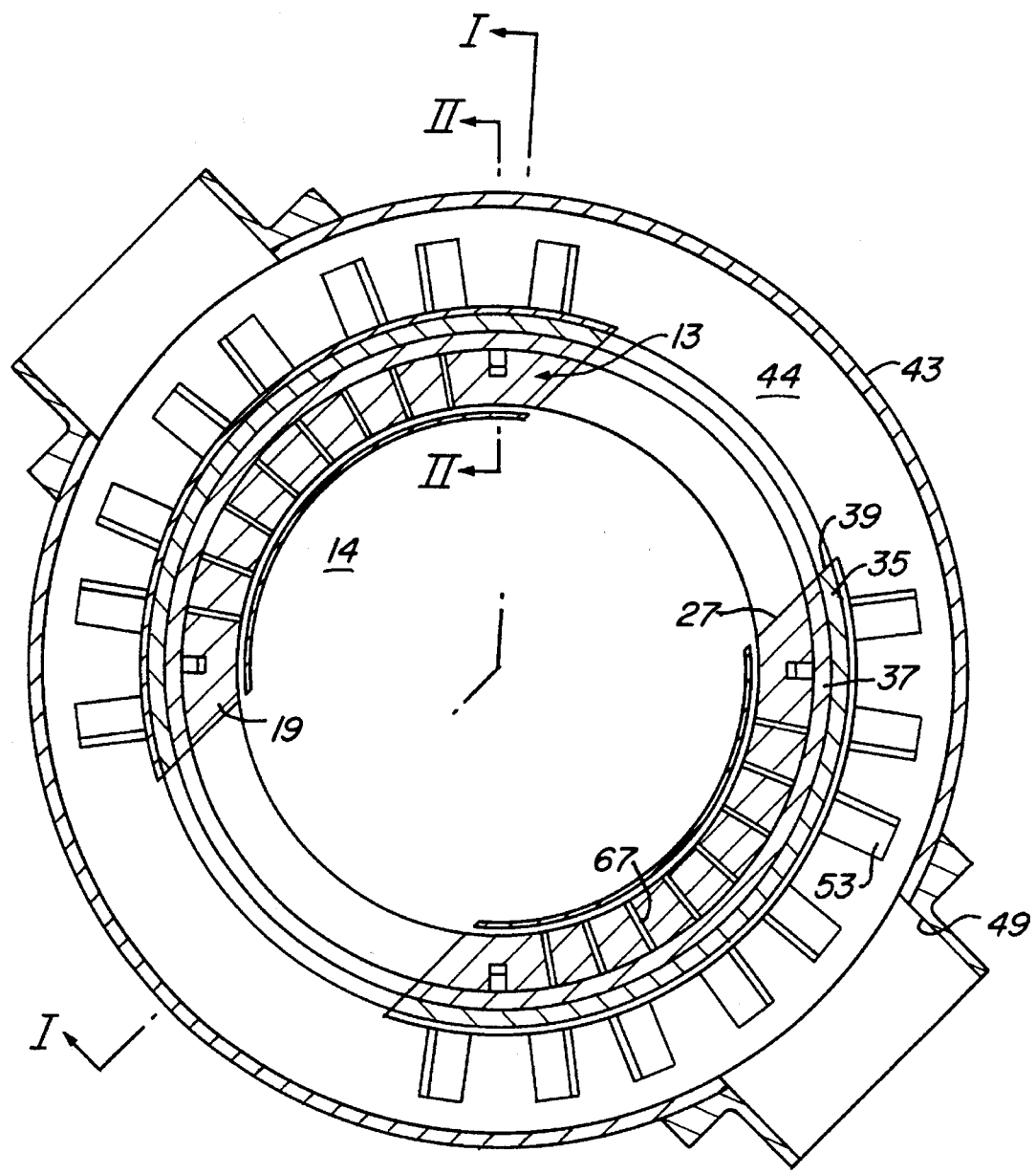
FIG. 3 is a sectional view of the pulse detonation engine of FIG. 1, taken along the line III—III of FIG. 1.

Referring to FIGS. 1 and FIG. 3, sidewall 19 of detonation chamber 13 has two forward or oxygen fuel ports 27 spaced 180° apart from each other. Oxygen fuel ports 27 are located a short distance from forward wall 15. Oxygen fuel ports 27 extend through the sidewall 19 as well as liner 23 in communication with detonation cavity 14. Similarly, there are two rearward or air fuel ports 29 spaced 180 degrees apart from each other (only one shown). Air fuel ports 29 also extend into detonation cavity 14. Air fuel ports 29 are spaced farther from forward wall 15 than oxygen fuel ports 27. The oxygen fuel and air fuel ports 27, 29 on each side of sidewall 19 are axially aligned with each other so that each is spaced the same degree or circumferential distance from a vertical axis passing through detonation chamber 13.

Figure 6:
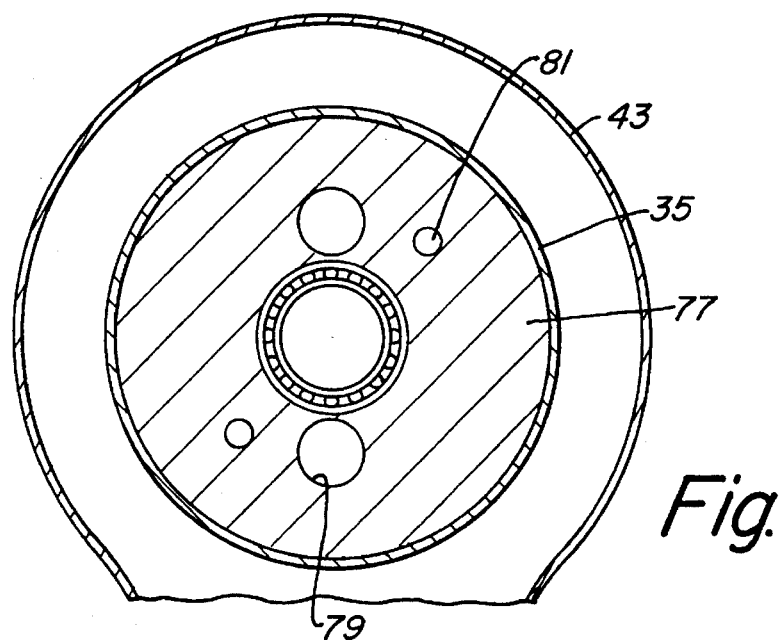
FIG. 6 is a partial sectional view of the pulse detonation engine of FIG. 1, taken along the line VI—VI of FIG. 1.

Referring to FIGS. 1 and 6, two purge ports 31 (only one shown in phantom in FIG. 1) extend through forward wall 15 parallel to longitudinal axis 21, each spaced 180 degrees apart from the other about axis 21. Each purge port 31 is a cylindrical passage that communicates cavity 14 with a purge gas, preferably ambient air exterior of pulse detonation engine 11. Purge ports 31 also extend through liner 23. Purge ports 31 are circumferentially offset from detonation chamber ports 27, 29 relative to the vertical axis. Also a pair of cooling air ports 33 (only one shown in phantom in FIG. 1) extend through forward wall 15. Cooling ports 33 are also parallel to longitudinal axis 21 and spaced 180 degrees from each other. Cooling fluid ports 33 will admit a cooling fluid which could be ambient air or another cooling fluid.

A valve sleeve 35 mounts rotatably to detonation chamber 13. Valve sleeve 35 is a cylindrical member that concentrically receives detonation chamber 13. Valve sleeve 35 has a high temperature inner liner 37 that rotates with valve sleeve 35. As shown also in FIG. 3, two oxygen fuel ports 39 extend through the sidewall of valve sleeve 35. Oxygen fuel ports 39 are spaced 180 degrees apart from each other and axially positioned to align with oxygen fuel ports 27 of detonation chamber 13. Oxygen fuel ports 39 will register with the oxygen fuel ports 27 twice per revolution of valve sleeve 35. Similarly, two air fuel ports 41 extend through a valve sleeve 35. Air fuel ports 41 are also spaced 180 degrees from each other and positioned axially so as to register twice per revolution with one of the air fuel ports 29 of detonation chamber 13.

A stationary valve housing 43 surrounds valve sleeve 35. Valve housing 43 has a larger diameter than valve sleeve 35, creating an annular space 44. A plurality of radial partitions 45 extend between valve housing 43 and valve sleeve 35, and are sealed with seals 47. Partitions 45 separate the annular space 44 into a forward section and a rearward section. Partitions 45 separate the oxygen and fuel flowing into oxygen fuel port 39 from the air and fuel flowing into air fuel port 41.

Two oxygen fuel supply ports 49 (only one shown in phantom in FIG. 1) extend through valve housing 43, spaced 180 degrees apart. Supply port 49 connects to a source of oxygen and fuel, such as hydrogen or propane. The oxygen and fuel may or may not be premixed. The content of the oxygen will be much higher than ambient air surrounding the engine 11 and is preferably pure. The source of oxygen will be an external storage tank on the aircraft. Two air fuel supply ports 51 (only one shown in phantom in FIG. 1) extend through housing 43, 180 degrees apart and rearward of oxygen fuel supply ports 51. Air fuel supply ports 51 are in communication with air fuel ports 41 and separated from oxygen fuel ports 39 by one of the partitions 45. Air fuel supply ports 51 are connected to a source of ambient air and a fuel such as hydrogen or propane. The air and fuel may or may not be premixed.

Figure 5:
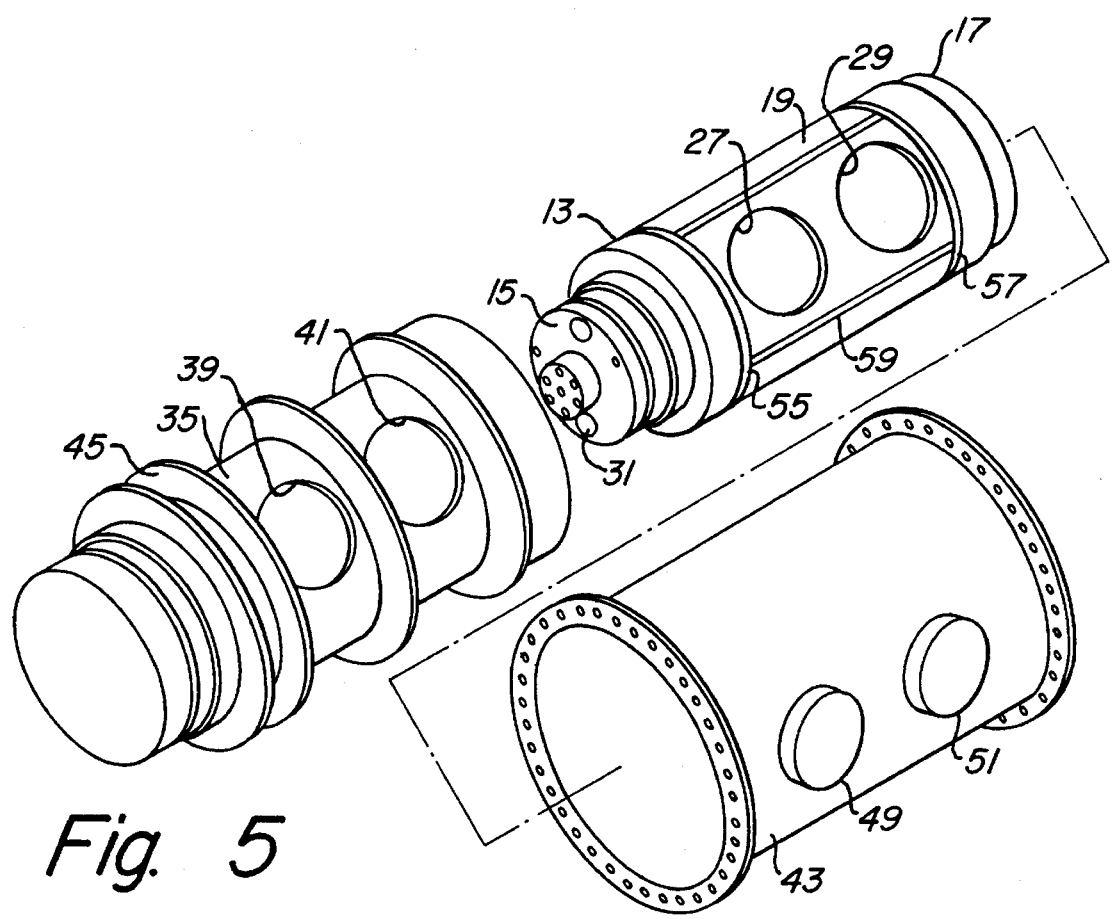
FIG. 5 is an exploded view of the major components of the pulse detonation engine of FIG. 1.

A plurality of rows of vanes 53 are mounted to the exterior valve sleeve 35 within annular base 44. Vanes 53 are oriented at different angles and protrude from valve sleeve 35 to assist in mixing of the gaseous fuel in the forward and rearward sections of annular space 44. For clarity, vanes 53 are not shown in FIG. 5.

Valve sleeve 35 is sealingly carried on the exterior of detonation chamber 13 by a pair of forward circular seals 55 and rearward circular seals 57. Circular seals 55, 57 are perpendicular to longitudinal axis 21. Seals 55, 57 are located in grooves formed on the exterior of detonation chamber 13. Linear seals 59, shown in FIGS. 2–5, extend between circular seals 55 and 57. Each linear seal 59 is a strip extending parallel to the longitudinal axis 21. As shown particularly in FIG. 2, each linear seal 59 is located in a straight groove 61 formed in the exterior of detonation chamber 13. A wave spring 63 locates in each groove 61 for urging linear seal 59 outward to sealingly engage liner 37 of valve sleeve 35. As shown in FIG. 3, linear seals 59 are located on opposite sides of each of the chamber ports 27, 29. When valve sleeve ports 39, 41 are rotated out of registry with chamber ports 27, 29, linear seals 59 prevent the detonated gases in detonation cavity 14 from passing out the chamber ports 27, 29.

Figure 4:
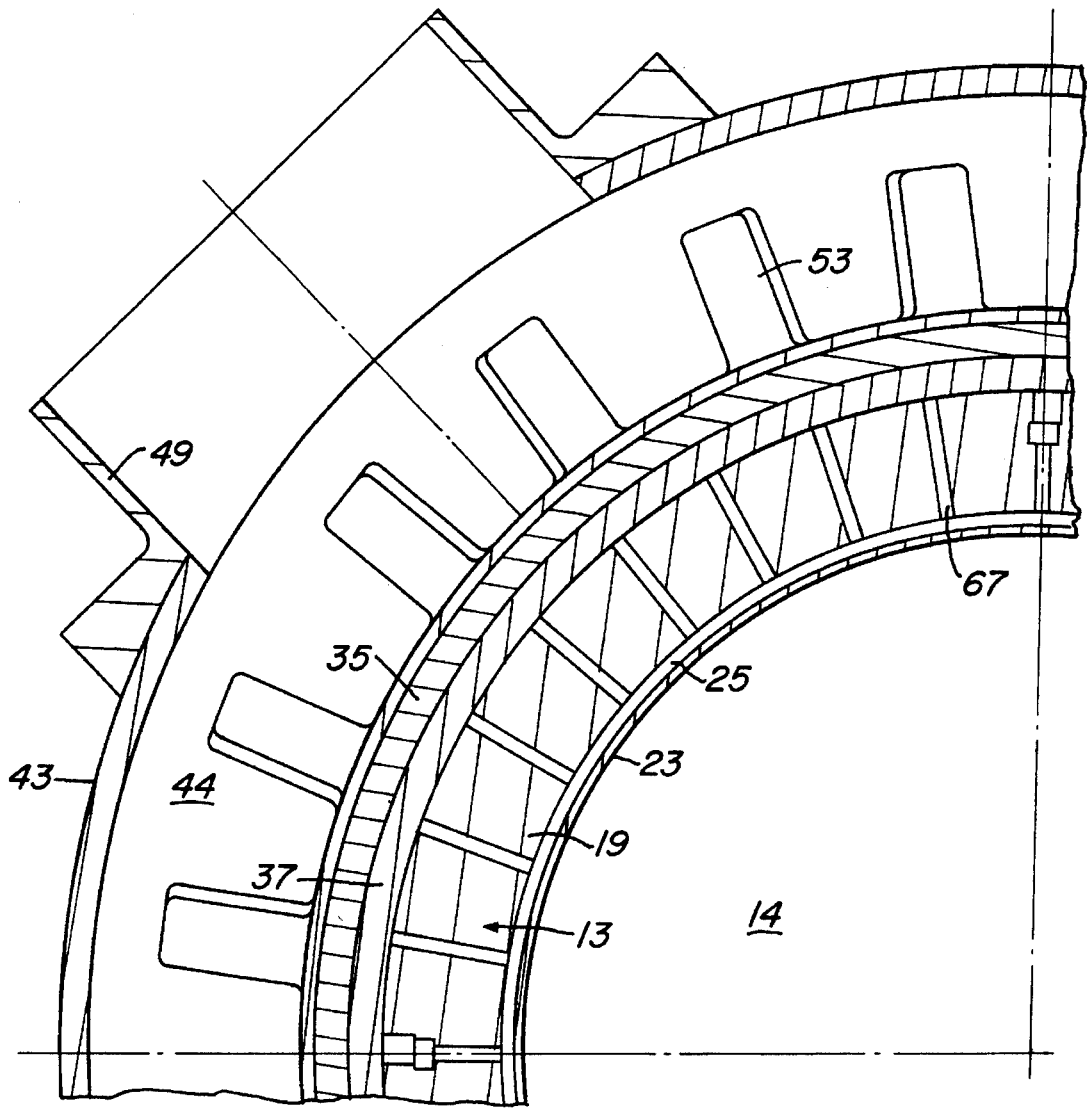
FIG. 4 is an enlarged sectional view of a portion of the pulse detonation as shown in FIG. 3.

Referring still FIG. 2, cooling fluid from clearances 25 pass through passages 65 to each of the linear grooves 61 for cooling the linear seals 59. Rear cooling fluid passages (not shown) discharge the cooling fluid from linear grooves 61 back into the clearances 25 to flow out the discharge end 17. As shown in FIG. 4, a plurality of cooling passages 67 extend from clearance 25 to the high temperature liner 37 at valve sleeve 35 to enhance cooling. Seals 55, 57 and 59 are of a high temperature material such as metal.

Referring again to FIG. 1, valve sleeve 35 is rotatably mounted to detonation chamber 13 on forward bearings 69 and rearward bearings 70. A driven gear 71 is secured to the forward end of valve sleeve 35. A drive gear 73 meshes with driven gear 71. Drive shaft 75 rotates drive gear 73 to rotate valve sleeve 35. Drive shaft 75 will be driven by an external power source which could be an electric motor, a hydraulic motor, or a conventional turbojet engine. In the latter instance, the conventional turbojet engine could also be used for supplying thrust at lower speeds when it is inefficient to operate pulse detonation engine 11.

A purge plate 77 mounts to the forward end of valve sleeve 35 as shown FIG. 1 and 6. Purge plate 77 is a circular plate that is perpendicular to axis 21. Purge plate 77 has two purge orifices 79 which are positioned to register with one of the chamber purge ports 31 twice each revolution. Purge plate 77 rotates with valve sleeve 35 and is positioned so that it will open the purge ports 31 immediately after detonation has occurred and the detonation wave passes from rearward end 17. When purging, ports 39, 41 of valve sleeve 35 are out of registry with the ports 27, 29 of detonation chamber 13 so that no fuel will flow into detonation cavity 14 when purging. Purge orifices 79 will rotate out of registry to close the purge ports 31 prior to introducing oxygen and fuel for the next cycle.

Referring still to FIG. 1, two cooling orifices 81 extend through purge plates 77. Cooling orifices 81 are positioned to align with the cooling fluid ports 33. Purge plate 77 will block the flow through cooling ports 33 unless the orifices 81 have registered with the cooling ports 33. This occurs at the same time that the purge orifices 79 register with the purge ports 31. The cooling fluid may be ambient air or a different fluid supplied from an external tank. The cooling fluid thus pulses through the clearances 25 (FIG. 2) and along the passages 65, 67 (FIG. 4).

An oil passage 83 extends through forward wall 15. The oil passage 83 supplies oil to bearings 69 and gears 71, 73. Similarly, oil passage 83 communicates with an oil passage 85 (FIG. 2) that extends longitudinally through the sidewall 19 of detonation chamber 13. As shown in FIG. 2, a small passage 87 delivers oil to the circular seals 55. The rearward bearings 70 and rearward seals 57 are similarly lubricated from oil passage 85. Referring again to FIG. 1, the oil is circulated, having a scavage port 89 at the forward end and a scavage port 91 at the rearward end.

The igniter means for igniting the gaseous fuel mixture may be a spark igniter, a capacitive discharge device, but is preferably comprises a laser 93. Laser 93 is mounted to the exterior of housing 43 and focused through a lens 95. A pair of holes 97 (only one shown) are spaced 180 degrees from each other in valve sleeve 35. Twice per revolution, holes 97 will align with a hole 99 in chamber sidewall 19 and with laser 93. This alignment focuses the laser to a precise point in detonation cavity 14 for causing a detonation. The detonation point will be near forward wall 15 on axis 21. Holes 97 are spaced to cause the detonation after valve sleeve ports 39 have moved out of registry with detonation chamber ports 27, 29, and before purge orifices 79 align with purge ports 31. When holes 97 are out of registry with hole 99, laser 93 will be sealed from the detonation cavity 14.

In operation, a drive source will rotate drive shaft 75 to rotate valve sleeve 35 relative to detonation chamber 13 and valve housing 43. Oxygen and a highly explosive fuel such as hydrogen or propane will be supplied through oxygen fuel supply ports 49. The fuel flows through annular space 44 and is further mixed by the vanes 53. Twice each revolution of valve sleeve 35, valve sleeve ports 39 will align with detonation chamber ports 27. This alignment introduces a discrete amount of hydrogen and oxygen into detonation cavity 14. At the same time, an air fuel mixture will be introduced through the aligned ports 41 and 29.

Immediately after the inflow of oxygen and fuel, one of the laser holes 97 will align with hole 99 and lens 95, causing a detonation of the oxygen hydrogen mixture. An initial detonation wave is created which moves rearward, propagating the fuel air mixture. The initial detonation wave flows out the rearward end 17 at supersonic speeds. A reverberating expansion wave, which is also considered a detonation wave herein, is created by the initial detonation wave. The expansion wave reflects off the forward wall 15 and discharges from the rearward end, creating additional thrust. In an aircraft, the high pressure exhaust creates thrust. Shortly after the expansion wave passes from discharge end 17, purge orifices 79 will register with purge ports 31. Ram air due to the forward movement of the aircraft flows through detonation cavity 14, acting as a purge gas for purging cavity 14 of burned gases. At the same time, the cooling orifices 81 register with cooling ports 33 to supply a cooling fluid such as air to the clearances 25 and cooling passages 65, 67 (FIG. 4).

The purge gas and the cooling fluid flow only momentarily, because the orifices 79, 81 will quickly rotate out of registry with the ports 31, 33. The cycle repeats twice per revolution. The detonations are preferably about one hundred per second, resulting in a rotational speed of valve sleeve 35 of 3,000 rpm.

The invention has significant advantages. Because the pulse detonation engine does not require compressors or turbines, the engine may have significant thrust to weight and thrust to volume improvements over conventional gas turbine engines. The use of oxygen rather than air makes the detonation possible. Once detonated, it will propagate a fuel air mixture. The purge air purges the cavity of exhaust products to prevent premature detonation. The mixer vanes mix the fuel and oxygen and fuel and air. The rotating valve sleeve provides an efficient manner for introducing the fuel mixtures. In addition to being used to create thrust for propulsion, the discharge of the engine can be used as a high pressure gaseous stream for purposes such as cleaning. Moreover, the engine can be used as a rocket power supply, without the need for ambient air, by supplying only oxygen and hydrogen as a fuel, and supplying a purge gas from a storage tank.

While the invention has been shown in only one of its forms, it should be apparent to those skilled in the art that it is not so limited, but is susceptible to various changes without departing from the scope of the invention.

We claim:

1. A pulse detonation apparatus, comprising in combination:

a detonation chamber having a sidewall, a longitudinal axis, a forward end and a rearward end which is open;

first and second detonation chamber ports located in the sidewall, spaced apart from each other in a longitudinal direction, with the first detonation chamber port being located closer to the forward end than the second detonation chamber port;

oxygen fuel valve means for introducing into the first detonation chamber port a discrete oxygen fuel mixture containing a fuel and a substantially higher concentration of oxygen than exists in ambient air surrounding the engine;

ignition means for detonating the oxygen fuel mixture in the detonation chamber, creating a detonation wave moving toward the rearward end; and air fuel valve means for introducing a discrete air fuel mixture into the second detonation chamber port which continues to propagate the detonation wave, causing the detonation wave to discharge out the rearward end.

2. The pulse detonation apparatus according to claim 1 further comprising purge means for purging the detonation chamber of burned gases with a purge gas after the detonation wave has passed from the rearward end and prior to introducing the oxygen fuel mixture for a next cycle.

3. The pulse detonation apparatus according to claim 1 further comprising:

a purge port communicating with the detonation chamber near the forward end of the detonation chamber; and purge valve means which opens the purge port after the detonation wave passes out the rearward end for admitting a purge gas to the detonation chamber to purge the detonation chamber of burned gases prior to introducing the oxygen fuel mixture for a next cycle, and for closing the purge port prior to introducing the oxygen fuel mixture of the next cycle.

4. The pulse detonation apparatus according to claim 1 wherein the oxygen fuel valve means and the air fuel valve means comprise:

a fuel valve sleeve which extends concentrically and sealingly around the detonation chamber, the fuel valve sleeve having first and second valve sleeve ports which are adapted to register with the first and second detonation chamber ports, respectively, and which are respectively in communication with sources of oxygen and fuel and air and fuel; and means for causing relative rotation between the valve sleeve and the detonation chamber, so that the first and second valve sleeve ports will register with the first and second detonation chamber ports, respectively, at least once each revolution to admit the oxygen fuel mixture and the air fuel mixture to the detonation chamber.

5. The pulse detonation apparatus according to claim 1 wherein the oxygen fuel valve means and the air fuel valve means comprise:

a fuel valve sleeve which extends concentrically and sealingly around the detonation chamber, the fuel valve sleeve having first and second valve sleeve ports which are adapted to register with the first and second detonation chamber ports, respectively, and which are respectively in communication with sources of oxygen and fuel and air and fuel; and means for rotating the valve sleeve and the detonation chamber relative to each other, so that the first and second valve sleeve ports will register with the first and second detonation chamber ports, respectively, at least once each revolution to admit the oxygen fuel mixture and the air fuel mixture to the detonation chamber; and wherein the apparatus further comprises:

a purge port communicating with the detonation chamber near the forward end of the detonation chamber; and purge valve means operable in response to rotation of the valve sleeve and detonation chamber relative to each other, for opening the purge port for admitting a purge gas to the detonation chamber to purge the detonation chamber of burned gases after the detonation wave has passed from the rearward end and prior to introducing the oxygen fuel mixture for a next cycle, and for closing the purge port prior to introducing the oxygen fuel mixture of the next cycle.

6. The pulse detonation apparatus according to claim 1 wherein the oxygen fuel valve means and the air fuel valve means comprise:

a fuel valve sleeve which extends concentrically and sealingly around the detonation chamber, the fuel valve sleeve having first and second valve sleeve ports which are adapted to register with the first and second detonation chamber ports, and which are respectively in communication with sources of oxygen and fuel and air and fuel; and means for rotating the valve sleeve relative to the detonation chamber, so that the first and second valve sleeve ports will register with the first and second detonation chamber ports, respectively, at least once each revolution to admit the oxygen fuel mixture and the air fuel mixture to the detonation chamber; and wherein the apparatus further comprises:

a purge port extending longitudinally through the forward end of the detonation chamber for communicating a purge gas with the detonation chamber; and a purge valve plate stationarily mounted to the valve sleeve transverse to the longitudinal axis, the purge valve plate having a purge orifice which registers with the purge port at least once per revolution of the valve sleeve for admitting a purge gas to the detonation chamber to purge the detonation chamber of burned gases after the detonation wave has passed from the rearward end and prior to introducing the oxygen fuel mixture for a next cycle, and for closing the purge port prior to introducing the oxygen fuel mixture of the next cycle.

7. A pulse detonation apparatus, comprising in combination:

a detonation chamber having a sidewall, a longitudinal axis, a forward end and a rearward end which is open;

at least one detonation chamber port located in the sidewall;

a fuel valve sleeve which concentrically and sealingly engages the detonation chamber, the fuel valve sleeve having at least one valve sleeve port which is adapted to register with the detonation chamber port;

drive means for rotating the valve sleeve and detonation chamber relative to each other about the longitudinal axis so that the valve sleeve port registers with the detonation chamber port at least once each revolution;

fuel supply means for introducing into the valve sleeve port a gaseous fuel mixture; and ignition means for detonating the fuel mixture in the detonation chamber, creating a detonation wave which discharges out the rearward end.

8. The pulse detonation apparatus of claim 7 wherein the ignition means comprises:

a laser mounted externally of the fuel valve sleeve and having a laser beam focused through a lens toward the interior of the detonation chamber;

at least one laser hole extending through the fuel valve sleeve and one laser hole extending through the detonation chamber and positioned so as to register with each other and with the laser beam at least once per revolution of the valve sleeve and detonation chamber relative to each other, so as to allow the laser beam to focus into the interior of the detonation chamber to create the detonation.

9. The pulse detonation apparatus according to claim 7, further comprising:

a purge port communicating with the detonation chamber at the forward end of the detonation chamber; and purge valve means which opens the purge port for admitting a purge gas to the detonation chamber to purge the detonation chamber of burned gases after the detonation wave has passed from the rearward end and prior to introducing the gaseous fuel mixture for a next cycle, and for closing the purge port prior to introducing the gaseous fuel mixture of the next cycle.

10. The pulse detonation apparatus according to claim 7, further comprising:

a purge port extending longitudinally through the forward end of the detonation chamber for communicating a purge gas with the detonation chamber; and a purge valve plate stationarily mounted to the valve sleeve perpendicular to the longitudinal axis, the purge valve plate having a purge orifice which registers with the purge port at least once per revolution of the valve sleeve and detonation chamber relative to each other, for admitting the purge gas to the detonation chamber to purge the detonation chamber of burned gases after the detonation wave has passed from the rearward end and prior to introducing the gaseous fuel mixture for a next cycle, and for closing the purge port prior to introducing the gaseous fuel mixture of the next cycle.

11. The pulse detonation apparatus according to claim 7, wherein:

the detonation chamber has at least two of the detonation chamber ports, one located forward of the other;

the valve sleeve has at least two of the valve sleeve ports, one located forward of the other; and the fuel supply means introduces an oxygen fuel mixture into the more forward of the valve sleeve ports and an air fuel mixture into the more rearward of the valve sleeve ports.

12. The pulse detonation apparatus according to claim 7, further comprising:

a housing surrounding the valve sleeve, defining an annular space between the valve sleeve and the housing, the housing having a housing port to which the fuel supply means is mounted, the drive means rotating the valve sleeve relative to the housing; and a plurality of vanes located in the annular space and mounted to the valve sleeve for rotation therewith for assisting in mixing of the gaseous fuel mixture flowing through the fuel supply means to the valve sleeve port.

13. The pulse detonation apparatus according to claim 7, further comprising:

a liner of material capable of withstanding high temperatures located within the detonation chamber, the liner being of smaller diameter than an inner diameter of the detonation chamber, defining an annular clearance; and cooling passage means for introducing cooling fluid into the annular clearance after the detonation wave has passed from the rearward end and prior to introducing the gaseous fuel mixture for a next cycle.

14. The pulse detonation apparatus according to claim 7, further comprising:

seal means located between an inner diameter of the valve sleeve and an outer diameter of the detonation chamber for sealing the chamber port and valve sleeve port when the ignition means detonates the fuel mixture.

15. The pulse detonation apparatus according to claim 7, further comprising:

seal means between an inner diameter of the valve sleeve and an outer diameter of the detonation chamber for sealing the chamber port and valve sleeve port when the ignition means detonates the fuel mixture; and cooling passage means leading to the seal means for supplying a cooling fluid to at least a portion of the seal means for cooling.

16. The pulse detonation apparatus according to claim 7, further comprising:

a purge port extending longitudinally through the forward end of the detonation chamber for communicating a purge gas with the detonation chamber;

a purge valve plate stationarily mounted to the valve sleeve perpendicular to the longitudinal axis, the purge valve plate having a purge orifice which registers with the purge port at least once per revolution of the valve sleeve and detonation chamber relative to each other, for admitting the purge gas to the detonation chamber to purge the detonation chamber of burned gases after the detonation wave has passed from the rearward end and prior to introducing the gaseous fuel mixture for a next cycle, and for closing the purge port prior to introducing the gaseous fuel mixture of the next cycle;

a liner of material capable of withstanding high temperatures located within the detonation chamber for rotation with the detonation chamber, the liner being of smaller diameter than an inner diameter of the detonation chamber, defining an annular clearance;

seal means between an inner diameter of the valve sleeve and an outer diameter of the detonation chamber for sealing the chamber port and valve sleeve port when the ignition means detonates the fuel mixture; and cooling passage means leading from the purge port to the annular clearance, to at least a portion of the seal means, and to the inner diameter of the valve sleeve for supplying a cooling fluid to the annular clearance, seal means and inner diameter of the valve sleeve each time the purge orifice registers with the purge port.

17. The pulse detonation apparatus according to claim 7, wherein the gaseous fuel mixture supplied by the fuel supply means consists essentially of fuel and oxygen, allowing the pulse detonation apparatus to function as a rocket engine.

18. A pulse detonation apparatus, comprising in combination:

a detonation chamber having a sidewall, a longitudinal axis, a forward end and a rearward end which is open;

forward and rearward detonation chamber ports located in the sidewall;

a fuel valve sleeve having an inner diameter which concentrically and sealingly engages the detonation chamber, the fuel valve sleeve having forward and rearward valve sleeve ports which are adapted to register with the forward and rearward detonation chamber ports, respectively;

drive means for rotating the valve sleeve about the longitudinal axis relative to the detonation chamber, so that the valve sleeve ports register with the detonation chamber ports at least once each revolution;

oxygen fuel supply means for introducing an oxygen fuel mixture into the forward valve sleeve port;

air fuel supply means for introducing an air fuel mixture into the rearward valve sleeve port, the air fuel mixture being of less concentration of oxygen than the oxygen fuel mixture;

ignition means for detonating the oxygen fuel mixture in the detonation chamber, creating a detonation wave which propagates with the air fuel mixture and passes out the rearward end;

a purge port extending longitudinally through the forward end of the detonation chamber for communicating a purge gas with the detonation chamber; and a purge valve plate stationarily mounted to the valve sleeve perpendicular to the longitudinal axis, the purge valve plate having a purge orifice which registers with the purge port at least once per revolution of the valve sleeve, admitting the purge gas to the detonation chamber to purge the detonation chamber of burned gases after the detonation wave has passed from the rearward end and prior to introducing the oxygen fuel mixture for a next cycle.

19. The pulse detonation apparatus according to claim 18, further comprising:

a housing surrounding and rotatably receiving the valve sleeve, defining an annular space between the valve sleeve and the housing, the housing having a housing port to which the oxygen fuel supply means and air fuel supply means are mounted; and a plurality of vanes mounted to an exterior surface of the valve sleeve for rotation therewith and located in the annular space for assisting in mixing of the oxygen and fuel and air and fuel flowing to the valve sleeve ports.

20. The pulse detonation apparatus according to claim 18, further comprising:

a liner of material capable of withstanding high temperatures located within the detonation chamber, the liner being of smaller diameter than an inner diameter of the detonation chamber, defining an annular clearance; and cooling fluid passage means leading to the annular clearance for introducing a cooling fluid when the purge orifice registers with the purge port.

21. The pulse detonation apparatus according to claim 18, further comprising:

seal means between an inner diameter of the valve sleeve and an outer diameter of the detonation chamber for sealing the chamber port and valve sleeve port when the ignition means detonates the oxygen fuel mixture; and cooling passage means leading to at least a portion of the seal means and to the inner diameter of the valve sleeve for supplying a cooling fluid to the seal means and the inner diameter of the valve sleeve when the purge orifice registers with the purge port.

22. The pulse detonation apparatus according to claim 18, further comprising:

a circular forward seal located between an inner diameter of the valve sleeve and an outer diameter of the detonation chamber forward of the forward chamber port and perpendicular to the longitudinal axis;

a circular rearward seal located between the inner diameter of the valve sleeve and the outer diameter of the detonation chamber rearward of the rearward chamber port and perpendicular to the longitudinal axis; and a pair of circumferentially spaced apart straight linear seals extending between the forward and rearward seals parallel to the longitudinal axis for sealing on each side of the chamber ports.

23. The pulse detonation apparatus according to claim 18, further comprising:

a circular forward seal located in a circular groove on an outer diameter of the detonation chamber forward of the forward chamber port and perpendicular to the longitudinal axis;

a circular rearward seal located in a circular groove on the outer diameter of the detonation chamber rearward of the rearward chamber port and perpendicular to the longitudinal axis;

a pair of circumferentially spaced apart straight linear seals extending in grooves on each side of the chamber ports on the outer diameter of the detonation chamber between the forward and rearward seals parallel to the longitudinal axis; and spring means in each of the linear grooves for urging the linear seals into sealing engagement with the valve sleeve.

24. The pulse detonation apparatus according to claim 18, further comprising:

a circular forward seal located in a circular groove on an outer diameter of the detonation chamber forward of the forward chamber port and perpendicular to the longitudinal axis;

a circular rearward seal located in a circular groove on the outer diameter of the detonation chamber rearward of the rearward chamber port and perpendicular to the longitudinal axis;

a pair of circumferentially spaced apart straight linear seals extending in grooves on each side of the chamber ports on the outer diameter of the detonation chamber between the forward and rearward seals parallel to the longitudinal axis;

a wave spring in each of the linear grooves in contact with the linear seals for urging the linear seals into sealing engagement with the valve sleeve; and cooling fluid passages leading to the linear grooves for supplying a cooling fluid to the linear seals.

25. A method of creating a high pressure gaseous discharge, comprising:

(a) providing a detonation chamber having a sidewall, a longitudinal axis, a forward end and a rearward end which is open;

(b) locating first and second detonation chamber ports located in the sidewall, spaced apart from each other in a longitudinal direction, with the first detonation chamber port being located closer to the forward end than the second detonation chamber port;

(c) introducing into the first detonation chamber port a discrete oxygen fuel mixture containing a fuel and a substantially higher concentration of oxygen than exists in ambient air surrounding the apparatus;

(d) detonating the oxygen fuel mixture in the detonation chamber, creating a detonation wave moving toward the rearward end; and (e) introducing a discrete air fuel mixture into the second detonation chamber port which is propagated by the detonation wave and passes out the rearward end as a high pressure gaseous discharge pulse; then (f) repeating steps (c) through (e) for a next cycle.

26. The method according to claim 25 further comprising purging the detonation chamber of burned gases with a purge gas after the detonation wave has passed from the rearward end and prior to introducing the oxygen fuel mixture for the next cycle.

27. A method of creating a high pressure gaseous discharge, comprising:

(a) providing a detonation chamber having a sidewall, a longitudinal axis, a forward end, a rearward end which is open, and at least one detonation chamber port located in the sidewall;

(b) mounting around the detonation chamber a fuel valve sleeve which has at least one valve sleeve port positioned to register with the detonation chamber port;

(e) causing rotation of the valve sleeve and the detonation chamber relative to each other about the longitudinal axis so that the valve sleeve port registers with the detonation chamber port at least once each revolution;

(f) introducing into the valve sleeve port a gaseous fuel mixture which flows through the detonation chamber port when the valve sleeve port registers with the detonation chamber port;

(g) detonating the fuel mixture in the detonation chamber when the valve sleeve port is out of registry with the detonation chamber port, creating a detonation wave moving toward the rearward end to create a high pressure gaseous pulse as the detonation wave passes out the rearward end; then (h) repeating steps (e) through (g) for a next cycle.

28. The method according to claim 27 further comprising purging the detonation chamber of burned gases with a purge gas after the detonation wave has passed from the rearward end and prior to introducing the gaseous fuel mixture for the next cycle.

29. The method according to claim 27 wherein step (f) comprises:

providing at least two of the chamber ports, one more forward than the other;

providing at least two of the valve sleeve ports, one more forward than the other;

introducing into the more forward of the valve sleeve ports a first mixture of oxygen and fuel having a substantially higher concentration of oxygen than ambient air; and introducing into the other of the valve sleeve ports a second mixture of ambient air mixed with fuel.

* * * * *